(12) United States Patent
Mukai (10) Patent No.: US 11,808,470 B2
(45) Date of Patent: Nov. 7, 2023

(54) CENTRALIZED CONTROL UNIT, EQUIPMENT CONTROL SYSTEM, AND CONTROL METHOD

(71) Applicant: Mitsubishi Electric Corporation, Tokyo (JP)

(72) Inventor: Takuya Mukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 252 days.

(21) Appl. No.: 17/418,676

(22) PCT Filed: Apr. 4, 2019

(86) PCT No.: PCT/JP2019/015038
§ 371 (c)(1),
(2) Date: Jun. 25, 2021

(87) PCT Pub. No.: WO2020/202542
PCT Pub. Date: Oct. 8, 2020

(65) Prior Publication Data
US 2022/0065481 A1    Mar. 3, 2022

(51) Int. Cl.
*F24F 11/54*   (2018.01)
*G05B 15/02*   (2006.01)
*H01R 13/642*  (2006.01)

(52) U.S. Cl.
CPC .............. *F24F 11/54* (2018.01); *G05B 15/02* (2013.01); *H01R 13/642* (2013.01)

(58) Field of Classification Search
CPC .. F24F 11/54; F24F 11/56; F24F 11/58; F24F 11/64; F24F 1/0003; G05B 15/02; G05B 2219/2614; H01R 13/642; G06F 1/16
See application file for complete search history.

(56) References Cited

U.S. PATENT DOCUMENTS

2009/0195341 A1* 8/2009 Rokuka ............... H01Q 1/1278
                                                    336/65
2012/0064782 A1* 3/2012 Kitajima ............. H01R 13/521
                                                    439/751
(Continued)

FOREIGN PATENT DOCUMENTS

JP    08-235100 A    9/1996
JP    2008-170047 A  7/2008
(Continued)

OTHER PUBLICATIONS

International Search Report dated Jun. 11, 2019 issued in the corresponding International Application No. PCT/JP2019/015038 (and English translation).

*Primary Examiner* — Ramesh B Patel
(74) *Attorney, Agent, or Firm* — POSZ LAW GROUP, PLC (57) ABSTRACT

An air-conditioning centralized management apparatus (10) for controlling air conditioners including an outdoor unit and an indoor unit includes a main unit (100) that has basic functions for controlling the air conditioners. The main unit (100) includes extension I/Fs (160) that each are connectable to an extension unit (200) that has an extension function for controlling the air conditioners. The extension I/Fs (160) are arranged on, for example, at four locations of the air-conditioning centralized management apparatus (10), on a top side, lower side, left side, and right side thereof, to improve flexibility in connection of the extension unit (200).

5 Claims, 6 Drawing Sheets (56) References Cited

U.S. PATENT DOCUMENTS

| | | | | |
|---|---|---|---|---|
| 2015/0308707 A1* | 10/2015 | Tanaka | .................. | G05B 15/02 |
| | | | | 700/276 |
| 2018/0097310 A1* | 4/2018 | Ju | ........................... | H01R 9/03 |
| 2019/0011143 A1* | 1/2019 | Rogers | .................. | F24F 11/523 |
| 2019/0067854 A1* | 2/2019 | Ju | ........................ | H01R 13/46 |

FOREIGN PATENT DOCUMENTS

| | | |
|---|---|---|
| JP | 2011-075248 A | 4/2011 |
| JP | 2017-123099 A | 7/2017 |
| WO | 2011/062080 A1 | 5/2011 |

\* cited by examiner

| REFERENCE SIGN | PIN NUMBER | SIGNAL NAME |
|---|---|---|
| P1 | 1, 11 | POWER SOURCE |
| P2 | 2, 10 | GND |
| P3 | 3, 9 | IDENTIFICATION INFORMATION (SECOND BIT) |
| P4 | 4, 8 | IDENTIFICATION INFORMATION (FIRST BIT) |
| P5 | 5, 7 | RECEPTION SIGNAL |
| P6 | 6 | TRANSMISSION SIGNAL |

CENTRALIZED CONTROL UNIT, EQUIPMENT CONTROL SYSTEM, AND CONTROL METHOD

CROSS REFERENCE TO RELATED APPLICATION

This application is a U.S. National Stage Application of International Application No. PCT/JP2019/015038, filed on Apr. 4, 2019, the contents of which are incorporated herein by reference.

TECHNICAL FIELD

The present disclosure relates to a centralized management apparatus, a device control system, and a control method.

BACKGROUND ART

Air-conditioning control systems that include, for example, multiple air conditioners and a centralized management apparatus for management of the air conditioners, are introduced heretofore for office buildings, commercial buildings, and the like. In the air conditioners, various types of sensors, for example, are arranged, in order to supply data measured by each sensor to the centralized management apparatus. The centralized management apparatus effectively uses the data collected from the air conditioners by, for example, giving feedback to control of the air conditioners, thereby improving energy conservation, comfort, or the like.

In recent years, to curb increase in cost for such centralized management apparatus, a configuration is proposed in which, rather than all of the functions, only basic functions necessary for air-conditioning control are installed in the centralized management apparatus, and in which extension functions can be appended according to needs of the installation site. The "basic functions" are functions that are necessary, such as functions for performing control or state monitoring for the air conditioners in the air-conditioning control system. The "extension functions" are, for example, a display function for causing display of information of the centralized management apparatus, and a communication function for connection to an external network or a facility network.

Furthermore, Patent Literature 1 discloses a technique for connecting an expansion box to a system controller and extending control functions for air-conditioning, illumination, or the like.

CITATION LIST

Patent Literature

Patent Literature 1: Unexamined Japanese Patent Application Publication No. 2011-75248

SUMMARY OF INVENTION

Technical Problem

Connecting an expansion box such as that disclosed in Patent Literature 1 to the centralized management apparatus is, however, sometimes impossible when there exist layout limitations in the installation location. For example, in a case where the centralized management apparatus is installed at a location of barely sufficient width, the expansion box cannot be arranged at the side of the centralized management apparatus. Thus, in a case where a connection interface is arranged for side-by-side connection at the side of the centralized management apparatus, the expansion box is unconnectable to the centralized management apparatus.

Due to the aforementioned circumstances, a technique is desired that enables addition of an extension function without being subject to layout limitation in the installation location.

The present disclosure is made to solve the aforementioned problems, and an objective of the present disclosure is to provide a centralized management apparatus, a device control system, and a control method that enable addition of an extension function without being subject to layout limitation in the installation location.

Solution to Problem

To achieve the aforementioned objective, a centralized management apparatus according to the present disclosure is a centralized management apparatus for controlling a device subject to management, the centralized management apparatus including:

a main unit that has basic functions for controlling the device, wherein
the main unit includes interfaces, each connectable to an extension unit that has an extension function for controlling the device.

Advantageous Effects of Invention

A centralized management apparatus according to the present disclosure includes a main unit that has basic functions for controlling, for example, an air conditioner. The main unit includes interfaces that each are connectable to an extension unit that has an extension function for controlling the air conditioner. These interfaces are arranged, for example, at four locations on the centralized management apparatus, on a top side, lower side, left side, and right side thereof, to improve flexibility in connection of the extension unit. For example, even in the case where there is insufficient space to the left of the centralized management apparatus for connecting the extension unit, a sufficient space above the centralized management apparatus enables connecting the extension unit via the interface arranged on the top side. As a result, addition of an extension function can be achieved without being subject to layout limitation in the installation location. Furthermore, installing only the basic functions in the main unit enables cost reduction, and connecting the extension unit to the main unit enables, according to various types of needs of the installation site, addition of an extension function that cannot be achieved by the basic functions alone.

DESCRIPTION OF EMBODIMENTS

Hereinafter, an embodiment of the present disclosure is described in detail with reference to the drawings. In the drawings, components that are the same or equivalent are assigned the same reference sign. Although an air-conditioning control system for controlling an air conditioner is described below as an example, the present disclosure can also be used, in a similar manner, for control systems for controlling other devices described below. That is to say, embodiments for explanation are described below, and the below description does not limit the scope of the present disclosure. Thus, persons skilled in the art can substitute an equivalent for each or all these elements of these embodiments, and such embodiments are included in the scope of the present disclosure.

Embodiment 1

Figure 1:
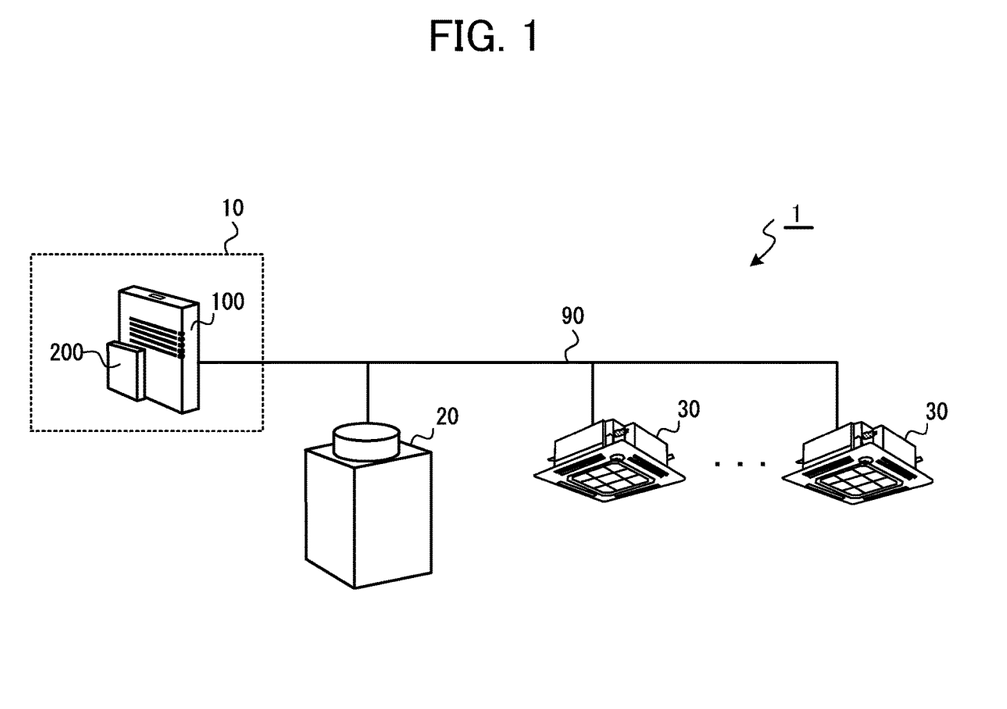
FIG. 1 is a schematic diagram illustrating an example of overall configuration of an air-conditioning control system according to an embodiment of the present disclosure.

FIG. 1 is a schematic diagram illustrating an example of overall configuration of an air-conditioning control system 1 according to an embodiment of the present disclosure. The air-conditioning control system 1 is installed in, for example, office buildings and commercial buildings, and is a system in which an air-conditioning centralized management apparatus 10 controls an outdoor unit 20 and indoor units 30 that are air conditioners. A ventilator may further be included as the air conditioners.

As illustrated, the air-conditioning control system 1 includes the air-conditioning centralized management apparatus 10, the outdoor unit 20, and a plurality of the indoor units 30. A plurality of the outdoor units 20 may be included. The air-conditioning centralized management apparatus 10 is connected to the outdoor unit 20 and the indoor units 30 via an air-conditioning communication network 90.

The air-conditioning centralized management apparatus 10 includes a main unit 100 and an extension unit 200 and controls the outdoor unit 20 and the indoor units 30 subject to management. The main unit 100 has basic functions for controlling the outdoor unit 20 and the indoor units 30. The extension unit 200 has an extension function for controlling the outdoor unit 20 and the indoor units 30.

Figure 2:
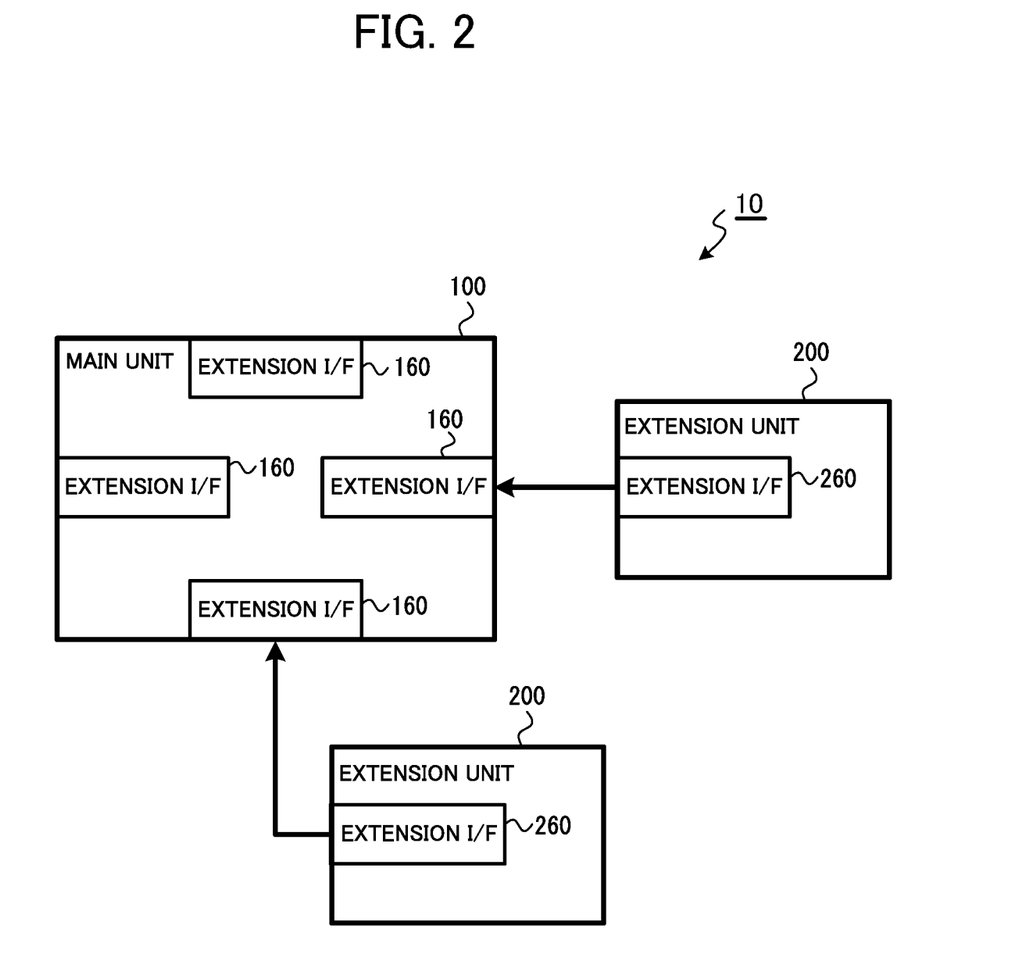
FIG. 2 is a schematic diagram for explanation of connection of a main unit and an extension unit in an air-conditioning centralized management apparatus.

In one example, the main unit 100 includes four extension interfaces (I/Fs) 160, as illustrated in FIG. 2. The extension unit 200 includes one extension I/F 260. The extension I/F 260 of the extension unit 200 is attachable to the extension I/Fs 160 of the main unit 100, to enable connection of the extension unit 200 to the main unit 100. The extension I/F 260 of the extension unit 200 is attachable to any of the extension I/Fs 160 of the main unit 100. Configurations of the main unit 100 and the extension unit 200 are described later in detail.

Again with reference to FIG. 1, the outdoor unit 20 is installed, for example, on a roof of a building, and is controlled by the air-conditioning centralized management apparatus 10. The outdoor unit 20 includes, for example, a compressor, a heat-source side heat exchanger, and the like, and is connected to the indoor units 30 by piping. The outdoor unit 20 causes circulation of a refrigerant through the piping between the outdoor unit 20 and the indoor units 30. The outdoor unit 20 includes, for example, a sensor for measurement of environment data that is data about an outdoor environment, such as an outdoor temperature and outdoor humidity, and transmits measured environment data to the air-conditioning centralized management apparatus 10 via the air-conditioning communication network 90.

The indoor units 30 are installed indoors, for example, on a ceiling, and are controlled by the air-conditioning centralized management apparatus 10. The indoor units 30 each include, for example, an expansion valve, a load-side heat exchanger, and the like, and are connected to the outdoor unit 20 by piping. The indoor units 30 each cause evaporation and condensation of the refrigerant using the load-side heat exchanger, thereby performing air conditioning of indoors. The indoor units 30 each include, for example, a sensor for measurement of environment data that is data about an indoor environment, such as an indoor temperature and indoor humidity, and transmits the measured environment data to the air-conditioning centralized management apparatus 10 via the air-conditioning communication network 90.

Hereinafter, the main unit 100 and the extension unit 200 that are included in the air-conditioning centralized management apparatus 10 are each described in detail with reference to the drawings.

Figure 3:
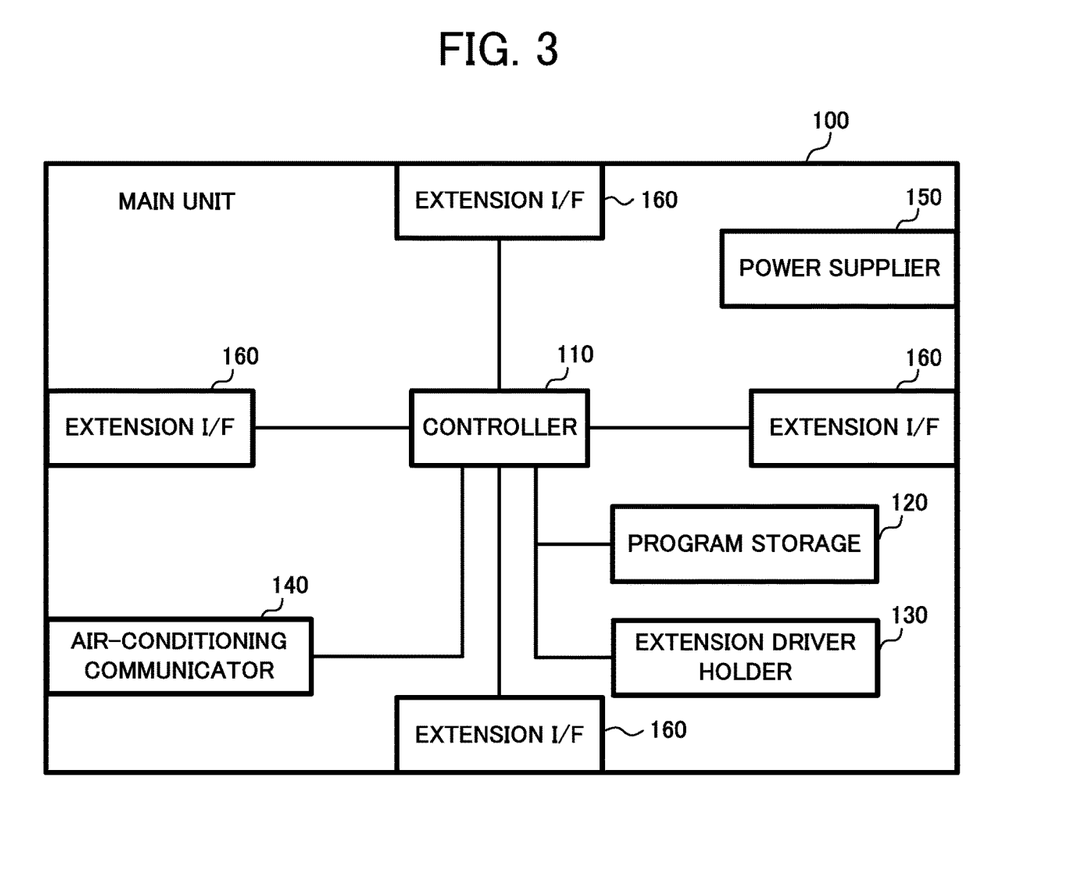
FIG. 3 is a block diagram illustrating example configuration of the main unit.

First, the main unit 100 is described with reference to FIG. 3. FIG. 3 is a block diagram illustrating example configuration of the main unit 100. As illustrated, the main unit 100 includes a controller 110, a program storage 120, an extension driver holder 130, an air-conditioning communicator 140, a power supplier 150, and the extension I/Fs 160 that each serve as an example of an interface.

The controller 110 is, for example, a calculating device that includes a central processing unit (CPU), random access memory (RAM), and the like and performs overall control of the air-conditioning centralized management apparatus 10 from the main unit 100. For example, the controller 110 executes an air-conditioning application and controls, via the air-conditioning communicator 140, the aforementioned outdoor unit 20 and the indoor units 30. In the case where the extension unit 200 is connected to the main unit 100, the controller 110 also controls the extension function of the extension unit 200. That is to say, the controller 110 controls the outdoor unit 20 and the indoor units 30 while controlling the extension function of the extension unit 200.

The program storage 120 is, for example, a non-volatile memory, and stores the air-conditioning application to be executed by the controller 110. The program storage 120 also stores a control program for controlling the extension function of the extension unit 200.

The extension driver holder 130 is, for example, a non-volatile memory or a volatile memory, and holds a driver that allows the controller 110 to drive the extension unit 200. Up to four extension units 200 are connectable to the main unit 100, and thus, the extension driver holder 130 has a capacity that enables holding of four drivers.

The air-conditioning communicator 140 communicates via the aforementioned air-conditioning communication network 90. That is to say, the controller 110 controls the air-conditioning communicator 140 to transmit and receive necessary information to and from the outdoor unit 20 and the indoor units 30. For example, the air-conditioning communicator 140 transmits a control command to the outdoor unit 20 and the indoor units 30. Additionally, the air-conditioning communicator 140 receives status information of the outdoor unit 20 and the indoor units 30, and receives the environment data such as temperature and humidity that is transmitted from the outdoor unit 20 and the indoor units 30.

The power supplier 150 generates a direct-current power source that is necessary for operating the main unit 100 from, for example, a commercial alternating-current power source. In the case where the extension unit 200 is connected to the main unit 100, the power supplier 150 supplies the direct-current power source to the extension unit 200 via the extension I/F 160.

The extension I/Fs 160 are each an interface for connection of the extension unit 200 to the main unit 100 and are arranged at four locations of the air-conditioning centralized management apparatus 10, on a top side, lower side, left side, and right side thereof. The number of the extension I/Fs 160 may be any number larger than two. Additionally, the arrangement locations may be modified appropriately as long as the locations are on different sides.

Figure 4A:
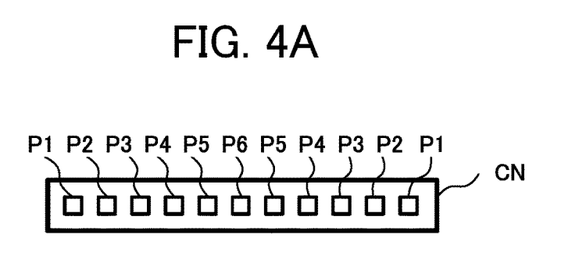
FIG. 4A is a schematic diagram illustrating an example arrangement of terminals of an extension I/F.

In one example, the extension I/Fs 160 each include a connector CN that has terminals arranged as illustrated in FIG. 4A and that is attachable to a connector of the extension unit 200 with terminals arranged to match the terminals of the connector CN. In one example, the extension I/Fs 160 each are a female connector CN and are connected to a male connector of the extension unit 200, although the male/female connectors may be reversed. As illustrated in FIG. 4A, the terminals of the connector CN are arranged to be bilaterally symmetric with respect to a terminal P6 serving as a center of the terminals. That is to say, multiple terminals are arranged so as to be bilaterally symmetric when viewed in a direction in which an arrangement direction of the terminals is horizontal. This configuration enables appropriate attachment, regardless of front-back connector orientation of the extension unit 200. That is to say, since terminals P1-P5 are each arranged to be bilaterally symmetric with respect to the terminal P6, attachment of the extension unit 200 to the connector CN leads to matching of the terminals therebetween regardless of the front-back connector orientation of attachment of the extension unit 200. This enables further flexibility in connection of the extension unit 200 to the main unit 100.

Figure 4B:
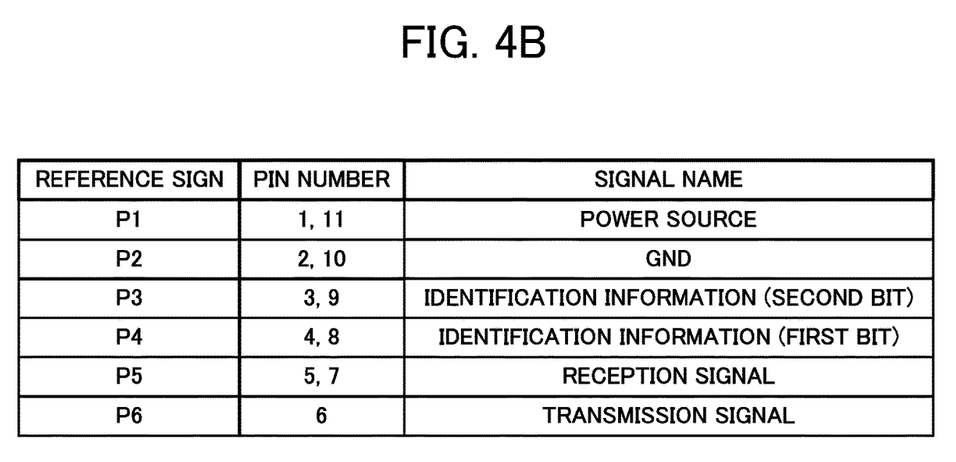
FIG. 4B is a diagram for detailed explanation of the arrangement of the terminals.

In one example, signals are allocated to the terminals P1-P6 as illustrated in FIG. 4B. Since the power source is allocated to the terminal P1 and the GND is allocated to the terminal P2 as illustrated in FIG. 4B, connecting the extension unit 200 to the main unit 100 causes supply of the power source from the aforementioned power supplier 150 to the extension unit 200.

Identification information is allocated to the terminals P3 and P4, and this enables identification of an extension function of a connected extension unit 200. A reception signal is allocated to the terminal P5 and a transmission signal is allocated to the terminal P6, and this enables communication between the main unit 100 and the extension unit 200.

Figure 5:
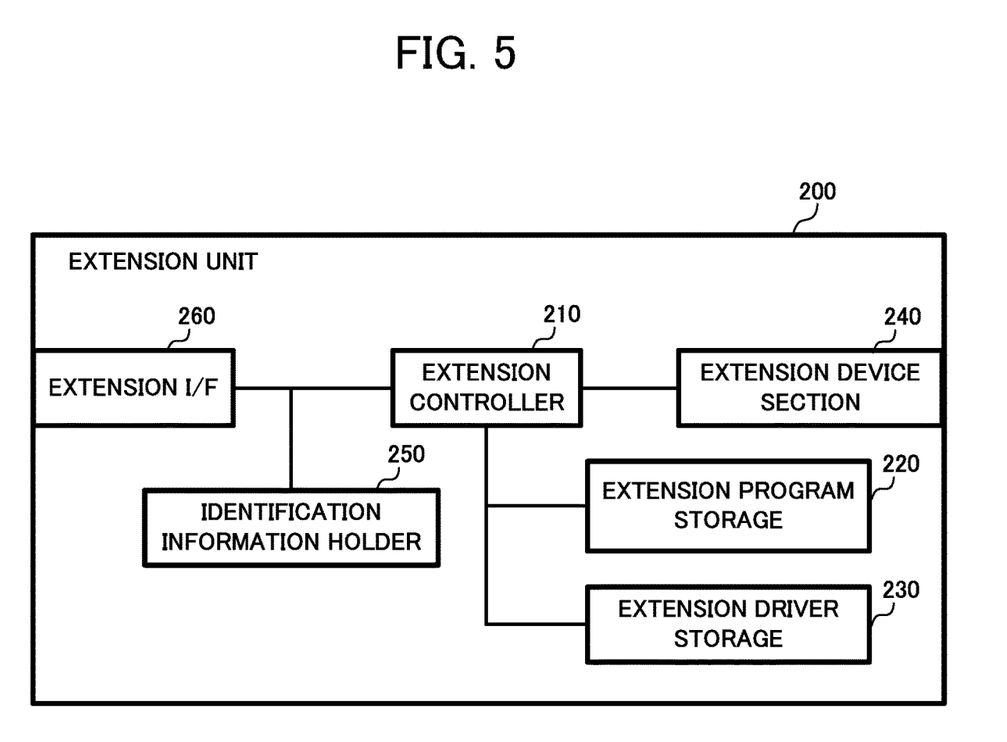
FIG. 5 is a block diagram illustrating example configuration of the extension unit.

Next, the extension unit 200 is described with reference to FIG. 5. FIG. 5 is a block diagram illustrating example configuration of the extension unit 200. As illustrated, the extension unit 200 includes an extension controller 210, an extension program storage 220, an extension driver storage 230, an extension device section 240, an identification information holder 250, and the extension I/F 260.

The extension controller 210 is, for example, a calculating device that includes a CPU, RAM, and the like, and controls the extension unit 200. Specifically, the extension controller 210 executes a program read from the extension program storage 220, and controls extension device section 240 based on an instruction from the main unit 100. Additionally, when the extension unit 200 is connected to the main unit 100, the extension controller 210 transmits, via the extension I/F 260 to the main unit 100, an extension driver read from the extension driver storage 230.

The extension program storage 220 is, for example, a non-volatile memory, and stores the program to be executed by the extension controller 210.

The extension driver storage 230 is, for example, a non-volatile memory, and stores the extension driver for transmission to the main unit 100.

The extension device section 240 includes various types of devices that each can be added to the air-conditioning centralized management apparatus 10 as an extension function. That is to say, various types of devices are mounted in the extension device section 240 according to the type of the extension unit 200. Specific examples of the extension unit 200 are listed below.

In the case where the extension unit 200 is a display extension unit, a touch panel liquid crystal, for example, is equipped with the extension device section 240. Connecting such display extension unit to the main unit 100 allows the air-conditioning centralized management apparatus 10 to, by the single air-conditioning centralized management apparatus 10, display useful information such as an operating status of the air conditioners and input necessary instruction to the air-conditioning centralized management apparatus 10.

In the case where the extension unit 200 is a wide-area communication extension unit, a long term evolution (LTE) communication module, for example, is mounted in the extension device section 240. Connecting such wide-area communication extension unit to the main unit 100 enables, from a remote location, obtaining useful information about the air-conditioning centralized management apparatus 10 and transmitting necessary instructions to the air-conditioning centralized management apparatus 10.

In the case where the extension unit 200 is a wireless-communication extension unit, a Wi-Fi communication module, for example, is mounted in the extension device section 240. Connecting such wireless-communication extension unit to the main unit 100 enables, via an indoor wireless local area network (LAN), obtaining useful information about the air-conditioning centralized management apparatus 10 and transmitting necessary instructions to the air-conditioning centralized management apparatus 10.

In the case where the extension unit 200 is a facility-communication extension unit, an RS-485 module, for example, is equipped with the extension device section 240. Connecting such facility-communication extension unit to the main unit 100 enables adding the air-conditioning centralized management apparatus 10 to an existing facility communication network to perform control in cooperation with another facility.

In the case where the extension unit 200 is a power-source extension unit, an uninterruptible power supply (UPS), for example, is equipped with the extension device section 240. Connecting such power-source extension unit to the main unit 100 enables operating the air-conditioning centralized management apparatus 10 even in the case of instantaneous interruption, power failure, or the like.

The identification information holder 250 is a circuit that holds identification information for identification of the type of the extension unit 200. The identification information holder 250 is, for example, a dual inline package (DIP) switch in which ON/OFF state of the switch is set according to the type of the extension device section 240.

The extension I/F 260 is an interface of the extension unit 200 and includes a connector with terminals arranged to match the aforementioned connector CN illustrated in FIG. 4A. The identification information held in the identification information holder 250 is supplied to the aforementioned terminals P3 and P4 illustrated in FIG. 4B. This configuration enables the main unit 100 to grasp the type of the connected extension unit 200.

Figure 6:
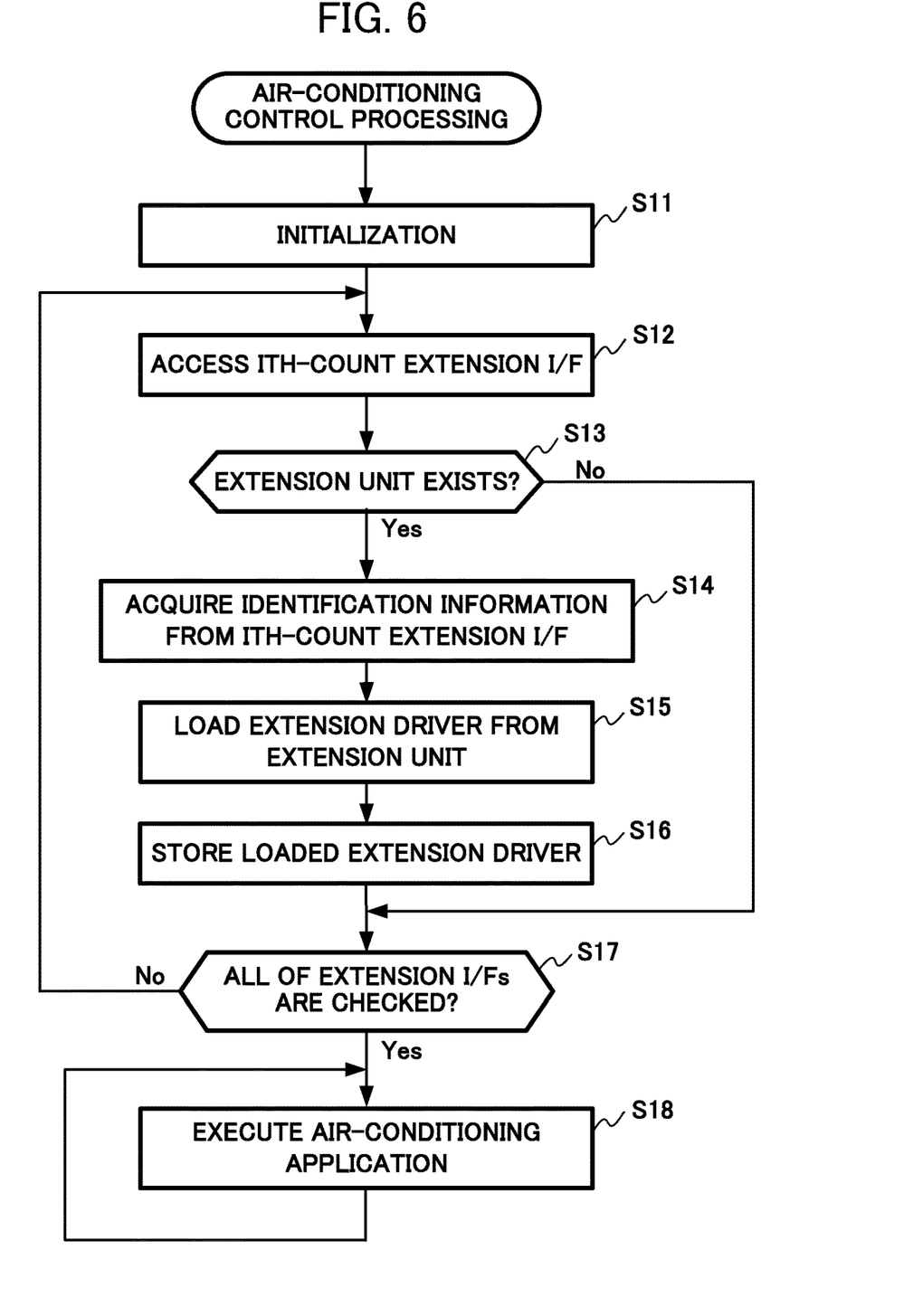
FIG. 6 is a flowchart for explanation of air-conditioning control processing according to an embodiment of the present disclosure.

Hereinafter, an operation of the air-conditioning centralized management apparatus 10 having the aforementioned configuration is described with reference to FIG. 6. FIG. 6 is a flowchart illustrating an example of air-conditioning control processing according to an embodiment of the present disclosure. This air-conditioning control processing is executed upon, for example, power up of the air-conditioning centralized management apparatus 10.

First, the main unit 100 of the air-conditioning centralized management apparatus 10 performs initialization (step S11). For example, the controller 110 sets an initial value of a variable "i" for counting the extension I/Fs 160 to zero. The variable "i" is taken to be a number ranging from zero to three for counting the four extension I/Fs 160. The controller 110 may, in addition to performing initialization of the variable "i", clear contents stored in the extension driver holder 130.

The main unit 100 accesses an $i^{th}$-count extension I/F 160 (step S12). That is to say, the controller 110 accesses an extension I/F 160 corresponding to the value of the variable "i".

The main unit 100 determines whether the extension unit 200 exists (step S13). For example, the controller 110 refers to the terminals P3 and P4 of the connector CN illustrated in FIG. 4A and included in the $i^{th}$-count extension I/F 160, and determines whether at least one of logical values for these terminals is zero. Both of the terminals P3 and P4 of the connector CN are pulled up in the main unit 100 such that the logical values for these terminals become "1" when open. Thus, the controller 110, in the case where the logical values for the terminals P3 and P4 are "1, 1", determines that no extension unit 200 is connected, and in the case where the logical values are other than "1, 1", determines that the extension unit 200 is connected.

Upon determining that no extension unit 200 exists (NO in step S13), the main unit 100 proceeds to the processing in step S17 described later.

Conversely, upon determining that the extension unit 200 exists (YES in step S13), the main unit 100 acquires the identification information from the $i^{th}$-count extension I/F 160 (step S14). For example, the controller 110 reads the logical values for the terminals P3 and P4 of the connector CN and identifies the type of the extension unit 200 connected to the $i^{th}$-count extension I/F 160.

The main unit 100 loads the extension driver from the extension unit 200 (step S15). That is to say, the controller 110 communicates with the extension unit 200 via the $i^{th}$-count extension I/F 160 and receives the extension driver transmitted from the extension unit 200. Thus, this step S15 is an example of a receiving step.

The main unit 100 stores the loaded extension driver (step S16). That is to say, the controller 110 stores, in the extension driver holder 130, the extension driver loaded in step S15.

The main unit 100 determines whether all of the extension I/Fs 160 are checked (step S17). For example, the controller 110, in the case where the value of the variable "i" is three, determines that all of the extension I/Fs 160 are checked.

Upon determining that not all of the extension I/Fs 160 are checked (NO in step S17), the main unit 100 returns the processing to the aforementioned step S12. In this case, the controller 110 adds one to the variable "i".

Conversely, upon determining that all of the extension I/Fs 160 are checked (YES in step S17), the main unit 100 executes the air-conditioning application (step S18). That is to say, the controller 110 executes the air-conditioning application read from the program storage 120 and thereby controls the outdoor unit 20 and the indoor units 30. In the case where the extension unit 200 is connected to the main unit 100, the controller 110 also controls the extension function of the extension unit 200. That is to say, the controller 110 controls the outdoor unit 20 and the indoor units 30 while controlling the extension function of the extension unit 200. Thus, this step S18 is an example of a control step.

The aforementioned control processing enables controlling the outdoor unit 20 and the indoor units 30 while controlling the extension function of the extension unit 200 connected to the main unit 100.

Furthermore, the main unit 100 of the air-conditioning centralized management apparatus 10 includes multiple extension I/Fs 160. The extension I/Fs 160 are, in one example, arranged at four locations on the air-conditioning centralized management apparatus 10, on the top side, lower side, left side, and right side thereof, to improve flexibility in connection of the extension unit 200. For example, even in the case where there is insufficient space to the left of the air-conditioning centralized management apparatus 10 for connecting the extension unit 200, a sufficient space above the air-conditioning centralized management apparatus 10 enables connecting the extension unit 200 via the extension I/F 160 arranged on the top side. As a result, addition of an extension function can be achieved without being subject to limitation in the layout of the installation location.

Furthermore, installing only the basic functions in the main unit 100 enables cost reduction, and connecting the extension unit 200 to the main unit 100 enables, according to various types of needs of the installation site, addition of an extension function that cannot be achieved by the basic functions alone.

Furthermore, both the terminals of the connector of each extension I/F 160 and the terminals of the connector of the extension I/F 260 are arranged to be bilaterally symmetrical, as illustrated in FIG. 4A. That is to say, multiple terminals are arranged so as to be bilaterally symmetric when viewed in a direction in which an arrangement direction of the terminals is horizontal. This configuration enables appropriate attachment, regardless of the front-back orientation of the connector of the extension unit 200. That is to say, since terminals P1-P5 are each arranged to be bilaterally symmetric with respect to the terminal P6, attachment of the extension unit 200 to the connector CN leads to matching of the terminals therebetween regardless of front-back orientation of attachment of the connector of the extension unit 200. This enables further flexibility in connection of the extension unit 200 to the main unit 100.

Other Embodiments

Although the aforementioned embodiment describes an example in which the terminals of the connector CN are arranged in a row as illustrated in FIG. 4A, the terminals may be arranged in multiple rows. In this case, by arranging the terminals to be rotationally-symmetric, attachment of the extension unit 200 to the connector CN leads to matching of the terminals therebetween regardless of front-back connection orientation of attachment of the connector of the extension unit 200.

Although an air-conditioning control system 1 for controlling air conditioners is described in the aforementioned embodiment, the present disclosure can also be used in a similar manner for control systems for controlling other devices. For example, the present disclosure can be used for an illumination control system for controlling an illumination device appropriately, that is to say, by employment of an illumination centralized management apparatus having configuration similar to that of the air-conditioning centralized management apparatus 10. This can also achieve addition of an extension function without being subject to layout limitation in the installation location.

The program that is executed in the aforementioned embodiment by the controller 110 of the main unit 100 included in the air-conditioning centralized management apparatus 10 can be distributed by storing the program in a computer-readable recording medium, such as a compact disc read only memory (CD-ROM), a digital versatile disc (DVD), a magneto-optical (MO) disk, a USB memory, and a memory card. Further, installing such program in a special-purpose computer or a general-purpose computer can cause the computer to function as the air-conditioning centralized management apparatus 10 according to the aforementioned embodiment.

Furthermore, the program may be stored in a disk device included in a server device on a communication network such as the Internet and may be downloaded onto a computer, for example, by superimposing the program on a carrier wave. Furthermore, the aforementioned processing can also be achieved by starting and executing the program while transferring the program through the communication network. Furthermore, the aforementioned processing can also be achieved by executing all or a portion of the program on the server device and by executing, using the computer, programming while transmitting and receiving information relating to the processing via the communication network.

In the case where the aforementioned functions are implemented by an operating system (OS) by allotment to the OS or are implemented by cooperation between the OS and an application, for example, storage and distribution on the medium of only portions of the program other than a portion of the program executed by the OS is permissible. Alternatively, such portions of the program may be downloaded onto a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be suitably used for a centralized management apparatus, a device control system, and a control method that enable addition of an extension function without being subject to layout limitation in an installation location.

REFERENCE SIGNS LIST

1 Air-conditioning control system
10 Air-conditioning centralized management apparatus
20 Outdoor unit
30 Indoor unit
90 Air-conditioning communication network
100 Main unit
110 Controller
120 Program storage
130 Extension driver holder
140 Air-conditioning communicator
150 Power supplier
160, 260 Extension I/F
200 Extension unit
210 Extension controller
220 Extension program storage
230 Extension driver storage
240 Extension device section
250 Identification information holder

The invention claimed is:

1. A centralized management apparatus for controlling a device subject to management, the centralized management apparatus comprising:
    a main unit that has basic functions for controlling the device, wherein
    the main unit includes a plurality of interfaces, each interface being connectable to a respective extension unit from a plurality of extension units, each extension unit having an extension function for controlling the device,
    the interfaces each include a connector in which terminals are arranged, and
    the terminals are arranged so as to be bilaterally symmetric with respect to a central terminal over a linear arrangement of the terminals, bilateral symmetry of the terminals being based on signal content.

2. The centralized management apparatus according to claim 1,
    wherein the interfaces are arranged on mutually different sides of the centralized management apparatus.

3. The centralized management apparatus according to claim 1,
    wherein the terminals include a terminal for indicating identification information for identification of the extension unit.

4. A device control system comprising:
    a device subject to management; and
    a centralized management apparatus to control the device, wherein
    the centralized management apparatus includes a main unit that has basic functions for controlling the device,
    the main unit includes a plurality of interfaces, each interface being connectable to a respective extension unit from a plurality of extension units, each extension unit having an extension function for controlling the device,
    the interfaces each include a connector in which terminals are arranged, and
    the terminals are arranged so as to be bilaterally symmetric with respect to a central terminal over a linear arrangement of the terminals, bilateral symmetry of the terminals being based on signal content.

5. A control method in a centralized management apparatus for controlling a device subject to management, the centralized management apparatus including a main unit that has basic functions for controlling the device, the main unit including a plurality of interfaces, each interface being connectable to respective extension unit from a plurality of extension units, each extension unit having an extension function for controlling the device, the interfaces each including a connector in which terminals are arranged, the terminals being arranged so as to be bilaterally symmetric with respect to a central terminal over a linear arrangement of the terminals, bilateral symmetry of the terminals being based on signal content, the control method comprising:

a receiving step of receiving a driver from one extension unit from the plurality of extensions units, the one extension unit being connected to one interface from the plurality of interfaces; and a control step of controlling the device while controlling one extension unit using the driver.

* * * * *